United States Patent
Morin et al.

(10) Patent No.: US 6,541,554 B2
(45) Date of Patent: Apr. 1, 2003

(54) LOW-SHRINK POLYPROPYLENE FIBERS

(75) Inventors: Brian G. Morin, Greer, SC (US); Nathan A. Mehl, Moore, SC (US); William S. Parks, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/860,005

(22) Filed: May 17, 2001

(65) Prior Publication Data

US 2003/0027907 A1 Feb. 6, 2003

(51) Int. Cl.⁷ .................................................. C08K 5/05
(52) U.S. Cl. ........................................................ 524/387
(58) Field of Search ......................................... 524/387

(56) References Cited

U.S. PATENT DOCUMENTS

| | | | |
|---|---|---|---|
| 4,016,118 A | 4/1977 | Hamada et al. | 260/17.4 SG |
| 4,463,113 A | 7/1984 | Nakahara et al. | 524/117 |
| 5,049,605 A | 9/1991 | Rekers | 524/108 |
| 5,342,868 A | 8/1994 | Kimura et al. | 524/108 |
| 5,798,167 A | 8/1998 | Connor et al. | 428/171 |
| 5,811,045 A | 9/1998 | Pike | 264/168 |
| 6,102,999 A | 8/2000 | Cobb, III et al. | 106/243 |
| 6,127,470 A | 10/2000 | Cobb, III et al. | 524/367 |
| 6,270,608 B1 * | 8/2001 | Vair | 156/176 |

OTHER PUBLICATIONS

ASTM Test Method D 3417–99 "Standard Test Method for Enthalpies of Fusion and Crystallization of Polymers by Differential Scanning Calorimetry (DSC)".

Spruiell et al., Journal of Applied Polymer Science, vol. 62, pp. 1965–1975 (1996).

Strobl, G., The Physics of Polymers; Springer: Berlin 1997, pp. 408–414.

* cited by examiner

*Primary Examiner*—Edward J. Cain
(74) *Attorney, Agent, or Firm*—Terry T. Moyer; William S. Parks (57) ABSTRACT

This invention relates to improvements in preventing heat- and moisture-shrink problems in specific polypropylene fibers. Such fibers require the presence of certain compounds that quickly and effectively provide rigidity to the target polypropylene fiber after heat-setting. Generally, these compounds include any structure that nucleates polymer crystals within the target polypropylene after exposure to sufficient heat to melt the initial pelletized polymer and upon allowing such a melt to cool. The compounds must nucleate polymer crystals at a higher temperature than the target polypropylene without the nucleating agent during cooling. In such a manner, the "rigidifying" nucleator compounds provide nucleation sites for polypropylene crystal growth. After drawing the nucleated composition into fiber form, the fiber is then exposed to sufficient heat to grow the crystalline network, thus holding the fiber in a desired position. The preferred "rigidifying" compounds include dibenzylidene sorbitol based compounds, as well as less preferred compounds, such as sodium benzoate, certain sodium and lithium phosphate salts (such as sodium 2,2'-methylene-bis-(4,6-di-tert-butylphenyl)phosphate, otherwise known as NA-11). Specific methods of manufacture of such fibers, as well as fabric articles made therefrom, are also encompassed within this invention.

25 Claims, 3 Drawing Sheets

FIG. -1-

LOW-SHRINK POLYPROPYLENE FIBERS

FIELD OF THE INVENTION

This invention relates to improvements in preventing heat- and moisture-shrink problems in specific polypropylene fibers. Such fibers require the presence of certain compounds that quickly and effectively provide rigidity to the target polypropylene fiber after heat-setting. Generally, these compounds include any structure that nucleates polymer crystals within the target polypropylene fiber after exposure to sufficient heat to melt the initial pelletized polymer and upon allowing such a melt to cool. The compounds must nucleate polymer crystals at a higher temperature than the target polypropylene without the nucleating agent during cooling. In such a manner, the "rigidifying" nucleator compounds provide nucleation sites for polypropylene crystal growth. After drawing the nucleated composition into fiber form, the fiber is then exposed to sufficient heat to grow the crystalline network, thus holding the fiber in a desired position. The preferred "rigidifying" compounds include dibenzylidene sorbitol based compounds, as well as less preferred compounds, such as sodium benzoate, certain sodium and lithium phosphate salts (such as sodium 2,2'-methylene-bis-(4,6-di-tert-butylphenyl)phosphate, otherwise known as NA-11). Specific methods of manufacture of such fibers, as well as fabric articles made therefrom, are also encompassed within this invention.

DISCUSSION OF THE PRIOR ART

There has been a continued desire to utilize polypropylene fibers in various different products, ranging from apparel to carpet backings (as well as carpet pile fabrics) to reinforcement fabrics, and so on. Polypropylene fibers exhibit excellent strength characteristics, highly desirable hand and feel, and do not easily degrade or erode when exposed to certain "destructive" chemicals. However, even with such impressive and beneficial properties and an abundance of polypropylene, which is relatively inexpensive to manufacture and readily available as a petroleum refinery byproduct, such fibers are not widely utilized in products that are exposed to relatively high temperatures during use, cleaning, and the like. This is due primarily to the high and generally non-uniform heat- and moisture-shrink characteristics exhibited by typical polypropylene fibers. Such fibers are not heat stable and when exposed to standard temperatures (such as 150° C. and 130° C. temperatures), the shrinkage range from about 5% (in boiling water) to about 7–8% (for c hot air exposure) to 12–13% (for higher temperature hot air). These extremely high and varied shrink rates thus render the utilization and processability of highly desirable polypropylene fibers very low, particularly for end-uses that require heat stability (such as apparel, carpet pile, carpet backings, molded pieces, and the like). To date, there has been no simple solution to such a problem. Some ideas have included narrowing and controlling the molecular weight distribution of the polypropylene components themselves in each fiber or mechanically working the target fibers prior to and during heat-setting. Unfortunately, molecular weight control is extremely difficult to accomplish initially, and has only provided the above-listed shrink rates (which are still too high for widespread utilization within the fabric industry). Furthermore, the utilization of very high heat-setting temperatures during mechanical treatment has, in most instances, resulted in the loss of good hand and feel to the subject fibers. Another solution to this problem is pre-shrinking the fibers, which involves winding the fiber on a crushable paper package, allowing the fiber to sit in the oven and shrink for long times, (crushing the paper package), and then rewinding on a package acceptable for further processing. This process, while yielding an acceptable yarn, is expensive, making the resulting fiber uncompetitive as compared to polyester and nylon fibers. As a result, there has not been any teaching or disclosure within the pertinent prior art providing any heat- and/or moisture-shrink improvements in polypropylene fiber technology.

DESCRIPTION OF THE INVENTION

It is thus an object of the invention to provide improved shrink rates for standard polypropylene fibers. A further object of the invention is to provide a class of additives that, in a range of concentrations, will give low shrinkage. A further object of the invention is to provide a specific method for the production of nucleator-containing polypropylene fibers permitting the ultimate production of such low-shrink fabrics therewith. Accordingly, this invention encompasses a polypropylene fiber possessing at most 5,000 denier per filament and exhibiting a heat-shrinkage in at least 150° C. hot air of at most 11%, wherein said fiber further comprises at least one nucleating agent. Also, this invention encompasses a polypropylene fiber possessing at most 5,000 denier per filament and exhibiting a heat-shrinkage in at least 150° C. hot air of at most 11%, wherein said fiber further comprises at least one nucleating agent, and wherein said fiber further exhibits a long period of at least 20 nm as measured by small-angle x-ray scattering. Furthermore, this invention encompasses a polypropylene fiber possessing at most 5,000 denier per filament and comprising at least one nucleating agent, and wherein said fiber further exhibits a long period of at least 20 nm as measured by small-angle x-ray diffraction spectroscopy. Additionally, this invention encompasses a polypropylene fiber possessing at most 5,000 denier per filament and exhibiting a peak crystallization temperature of at least 115° C. as measured by differential scanning calorimetry in accordance with a modified ASTM Test Method D3417-99 at a cooling rate of 20° C./min, and wherein said fiber further exhibits a long period of at least 20 nm as measured by small-angle x-ray scattering. Certain yarns and fabric articles comprising such inventive fibers are also encompassed within this invention.

Furthermore, this invention also concerns a method of producing such fibers comprising the sequential steps of a) providing a polypropylene composition in pellet or liquid form comprising at least 100 ppm by weight of a nucleator compound; b) melting and mixing said polypropylene composition of step "a" to form a substantially homogeneous molten plastic formulation; c) extruding said plastic formulation to form a fiber structure; d) mechanically drawing said extruded fiber (optionally while exposing said fiber to a temperature of at most 105° C.); and e) exposing said drawn fiber of step "d" to a subsequent heat-setting temperature of at least 110° C. Preferably, step "b" will be performed at a temperature sufficient to effectuate the melting of all polymer constituent (e.g., polypropylene), and possibly the remaining compounds, including the nucleating agent, as well (melting of the nucleating agent is not a requirement since some nucleating agents do not melt upon exposure to such high temperatures). Thus, temperatures within the range of from about 175 to about 300° C., as an example (preferably from about 200 to about 275°, and most preferably from about 220 to about 250° C., are proper for this purpose. The extrusion step ("c") should be performed while exposing the polypropylene formulation to a temperature of from about 185 to about 300° C., preferably from about 210 to about 275° C., and most preferably from about 230 to about 250° C., basically sufficient to perform the extrusion of a liquefied polymer without permitting breaking of any of the fibers themselves during such an extrusion procedure. The drawing step may be performed at a temperature which is cooler than normal for a standard polypropylene (or other polymer) fiber drawing process. Thus, if a cold-drawing step is followed, such a temperature should be below about 105° C., more preferably below about 100° C., and most preferably below about 90° C. Of course, higher temperatures may be used if no such cold drawing step is followed. The final heat-setting temperature is necessary to "lock" the polypropylene crystalline structure in place after extruding and drawing. Such a heat-setting step generally lasts for a portion of a second, up to potentially a couple of minutes (i.e., from about $\frac{1}{10}^{th}$ of a second, preferably about ½ of a second, up to about 3 minutes, preferably greater than ½ of a second). The heat-setting temperature must be greater than the drawing temperature and must be at least 110° C., more preferably at least about 115°, and most preferably at least about 125° C. The term "mechanically drawing" is intended to encompass any number of procedures which basically involve placing an extensional force on fibers in order to elongate the polymer therein. Such a procedure may be accomplished with any number of apparatus, including, without limitation, godet rolls, nip rolls, steam cans, hot or cold gaseous jets (air or steam), and other like mechanical means.

In another embodiment of the method of making such inventive fibers, step "c" noted above may be further separated into two distinct steps. A first during which the polymer is extruded as a sheet or tube, and a second during which the sheet or tube is slit into narrow fibers of less than 5000 deniers per filament (dpf).

All shrinkage values discussed as they pertain to the inventive fibers and methods of making thereof correspond to exposure times for each test (hot air and boiling water) of about 5 minutes. The heat-shrinkage at about 150° C. in hot air is, as noted above, at most 11% for the inventive fiber; preferably, this heat-shrinkage is at most 9%; more preferably at most 8%; and most preferably at most 7%. Also, the amount of nucleating agent present within the inventive fiber is at least 10 ppm; preferably this amount is at least 100 ppm; and most preferably is at least 1250 ppm. Any amount of such a nucleating agent should suffice to provide the desired shrinkage rates after heat-setting of the fiber itself; however, excessive amounts (e.g., above about 10,000 ppm and even as low as about 6,000 ppm) should be avoided, primarily due to costs, but also due to potential processing problems with greater amounts of additives present within the target fibers.

The term "polypropylene" is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as syndiotactic, isotactic, and the like). Thus, the term as applied to fibers is intended to encompass actual long strands, tapes, threads, and the like, of drawn polymer. The polypropylene may be of any standard melt flow (by testing); however, standard fiber grade polypropylene resins possess ranges of Melt Flow Indices between about 2 and 50. Contrary to standard plaques, containers, sheets, and the like (such as taught within U.S. Pat. No. 4,016,118 to Hamada et al., for example), fibers clearly differ in structure since they must exhibit a length that far exceeds its cross-sectional area (such, for example, its diameter for round fibers). Fibers are extruded and drawn; articles are blow-molded or injection molded, to name two alternative production methods. Also, the crystalline morphology of polypropylene within fibers is different than that of standard articles, plaques, sheets, and the like. For instance, the dpf of such polypropylene fibers is at most about 5000; whereas the dpf of these other articles is much greater. Polypropylene articles generally exhibit spherulitic crystals while fibers exhibit elongated, extended crystal structures. Thus, there is a great difference in structure between fibers and polypropylene articles such that any predictions made for spherulitic particles (crystals) of nucleated polypropylene do not provide any basis for determining the effectiveness of such nucleators as additives within polypropylene fibers.

The terms "nucleators", "nucleator compound(s)", "nucleating agent", and "nucleating agents" are intended to generally encompass, singularly or in combination, any additive to polypropylene that produces nucleation sites for polypropylene crystals from transition from its molten state to a solid, cooled structure. Hence, since the polypropylene composition (including nucleator compounds) must be molten to eventually extrude the fiber itself, the nucleator compound will provide such nucleation sites upon cooling of the polypropylene from its molten state. The only way in which such compounds provide the necessary nucleation sites is if such sites form prior to polypropylene recrystallization itself. Thus, any compound that exhibits such a beneficial effect and property is included within this definition. Such nucleator compounds more specifically include dibenzylidene sorbitol types, including, without limitation, dibenzylidene sorbitol (DBS), monomethyldibenzylidene sorbitol, such as 1,3:2,4-bis(p-methylbenzylidene)sorbitol (p-MDBS), dimethyl dibenzylidene sorbitol, such as 1,3:2,4-bis(3,4-dimethylbenzylidene)sorbitol(3,4-DMDBS); other compounds of this type include, again, without limitation, sodium benzoate, NA-11, and the like. The concentration of such nucleating agents (in total) within the target polypropylene fiber is at least 100 ppm, preferably at least 1250 ppm. Thus, from about 100 to about 5000 ppm, preferably from about 500 ppm to about 4000 ppm, more preferably from about 1000 ppm to about 3500 ppm, still more preferably from about 1500 ppm to about 3000 ppm, even more preferably from about 2000 ppm to about 3000 ppm, and most preferably from about 2500 to about 3000 ppm. Furthermore, fibers may be produced by the extrusion and drawing of a single strand of polypropylene as described above, or also by extrusion of a sheet, then cutting the sheet into fibers, then following the steps as described above to draw, heat-set, and collect the resultant fibers. In addition, other methods to make fibers, such as fibrillation, and the like, are envisioned for the same purpose.

Also, without being limited by any specific scientific theory, it appears that the shrink-reducing nucleators which perform the best are those which exhibit relatively high solubility within the propylene itself. Thus, compounds which are readily soluble, such as 1,3:2,4-bis(p-methylbenzylidene)sorbitol provides the lowest shrinkage rate for the desired polypropylene fibers. The DBS derivative compounds are considered the best shrink-reducing nucleators within this invention due to the low crystalline sizes produced by such compounds. Other nucleators, such as NA-11, also provide good low-shrink characteristics to the target polypropylene fiber; however, apparently due to poor dispersion of NA-11 in polypropylene and the large and varied crystal sizes of NA-11 within the fiber itself, the shrink rates are noticeably higher than for the highly soluble, low crystal-size polypropylene produced by well-dispersed MDBS.

One manner of testing for the presence of a nucleating agent within the target fibers is preferably through differential scanning calorimetry to determine the peak crystallization temperature exhibited by the resultant polypropylene. The fiber is melted and placed between two plates under high temperature and pressure to form a sheet of sample plastic. A sample of this plastic is then melted and subjected to a differential scanning calorimetry analytical procedure in accordance with modified ASTM Test Method D3417-99 at a cooling rate of 20° C./minute. A sufficiently high peak crystallization temperature (above about 115° C., more preferably above about 116° C., and most preferably above about 116.5° C.), well above that exhibited by the unnucleated polypropylene itself, shall indicate the presence of a nucleating agent since attaining such a high peak crystallization without a nucleating agent is not generally possible.

It has been determined that the nucleator compounds that exhibit good solubility in the target molten polypropylene resins (and thus are liquid in nature during that stage in the fiber-production process) provide more effective low-shrink characteristics. Thus, low substituted DBS compounds (including DBS, p-MDBS) appear to provide fewer manufacturing issues as well as lower shrink properties within the finished polypropylene fibers themselves. Although p-MDBS is preferred, however, any of the above-mentioned nucleators may be utilized within this invention as long as the long period (SAXS) measurements are met or the low shrink requirements are achieved through utilization of such compounds. Mixtures of such nucleators may also be used during processing in order to provide such low-shrink properties as well as possible organoleptic improvements, facilitation of processing, or cost.

In addition to those compounds noted above, sodium benzoate and NA-11 are well known as nucleating agents for standard polypropylene compositions (such as the aforementioned plaques, containers, films, sheets, and the like) and exhibit excellent recrystallization temperatures and very quick injection molding cycle times for those purposes. The dibenzylidene sorbitol types exhibit the same types of properties as well as excellent clarity within such standard polypropylene forms (plaques, sheets, etc.). For the purposes of this invention, it has been found that the dibenzylidene sorbitol types are preferred as nucleator compounds within the target polypropylene fibers. Of interest, as e well, is the ability to provide a purely liquid formulation of the dibenzylidene sorbitol compounds for introduction within the target polypropylene compositions. Such liquid DBS formulations comprise certain nonionic surfactants that can be selected both for their liquefying and stability-providing benefits to the DBS compounds themselves, but also potentially for their lubricating properties for the eventual fiber. In such a manner, the amount of lubricant generally required for and added to the target fiber may be reduced or eliminated, thus reducing costs associated with such additives. Thus, the surfactants required for such a liquid nucleator composition of 3,4-DMDBS (or other types of nucleating agents), include those which are nonionic and which are ethoxylated to the extent that their hydrophilic-lipophilic balance (HLB) is greater than about 8.5. HLB is a measure of the solubility of a surfactant both in oil and in water and is approximated as one-fifth (⅕) the weight percent of ethoxy groups present on the particular surfactant backbone. More specifically, such surfactants exhibit a HLB value of more preferably greater than about 12, and most preferably greater than about 13, and must possess at least some degree of ethoxylation, more preferably greater than about 4 molar equivalents of ethylene oxide (EO) per molecule, and most preferably greater than about 9.5 molar equivalents of EO per molecule.

Of these preferred surfactants, the most preferred for utilization within the potential fluid nucleating agent dispersion for purposes of this invention include, in tabulated form:

SURFACTANT TABLE
Preferred Diluent Surfactants (with Tradenames)

| Ex. | Surfactant | Available as and From | HLB # |
|---|---|---|---|
| 1 | sorbitan monooleate (20 EO) | Tween 80 ®; Imperial Chemical (ICI) | 15.0 |
| 2 | sorbitan monostearate (20 EO) | Tween 60 ®; ICI | 14.9 |
| 3 | sorbitan monopalmitate (20 EO) | Tween 40 ®; ICI | 15.6 |
| 4 | sorbitan monolaurate (20 EO) | Tween 20 ®; ICI | 16.7 |
| 5 | dinonylphenol ether (7 EO) | Igepal ® DM 430; Rhone-Poulenc (RP) | 9.5 |
| 6 | nonylphenol ether (6 EO) | Igepal ® CO 530; RP | 10.8 |
| 7 | nonylphenol ether (12 EO) | Igepal ® CO 720; RP | 14.2 |
| 8 | dinonylphenol ether (9 EO) | Igepal ® DM 530; RP | 10.6 |
| 9 | nonylphenol ether (9 EO) | Igepal ® CO 630; RP | 13.0 |
| 10 | nonylphenol ether (4 EO) | Igepal ® CO 430; RP | 8.8 |
| 11 | dodecylphenol ether (5.5 EO) | Igepal ® RC 520; RP 430 | 9.6 |
| 12 | dodecylphenol ether (9.5 EO) | Igepal ® RC 620; RP | 12.3 |
| 13 | dodecylphenol ether (11 EO) | Igepal ® RC 630; RP | 13.0 |
| 14 | nonylphenol ether (9.5 EO) | Syn Fac ® 905; Milliken & Company | ~13 |
| 15 | octylphenol ether (10 EO) | Triton ® X-100; Rohm & Haas | 13.5 |

This list is not exhaustive as these are merely the preferred surfactants for use within the potential fluid nucleating agent dispersion for utilization within this invention. In such a fluid dispersion, then, the nucleating agent, such as preferably 3,4-DMDBS, comprises at most 40% by weight, preferably about 30% by weight, of the entire inventive fluid dispersion. Any higher amount will deleteriously affect the viscosity of the dispersion. Preferably the amount of surfactant is from about 70% to about 99.9%, more preferably from about 70% to about 85%; and most preferably, from about 70% to about 75% of the entire inventive fluid dispersion. A certain amount of water may also be present in order to effectively lower the viscosity of the overall liquid dispersion. Optional additives may include plasticizers, antistatic agents, stabilizers, ultraviolet absorbers, and other similar standard polyolefin thermoplastic additives. Other additives may also be present within this composition, most notably antioxidants, antistatic compounds, perfumes, chlorine scavengers, and the like. As noted above, this type of fluid dispersion is disclosed in greater detail within U.S. Pat. Nos. 6,102,999 and 6,127,440, both herein entirely incorporated by reference. Most preferred is a composition of 30% by weight of 3,4-DMDBS and 70% by weight of Tween® 80. This mixture is listed in the Preferred Embodiments section below as "Liquid 3,4-DMDBS".

The closest prior art references teach the addition of nucleator compounds to general polypropylene compositions (such as in U.S. Pat. No. 4,016,118, referenced above). However, some teachings include the utilization of certain DBS compounds within limited portions of fibers in a multicomponent polypropylene textile structure. For example, U.S. Pat. Nos. 5,798,167 to Connor et al. and 5,811,045 to Pike, both teach the addition of DBS compounds to polypropylene in fiber form; however, there are vital differences between those disclosures and the present invention. For example, both patents require the aforementioned multicomponent structures of fibers. Thus, even with DBS compounds in some polypropylene fiber components within each fiber type, the shrink rate for each is dominated by the other polypropylene fiber components which do not have the benefit of the nucleating agent. Also, there are no lamellae that give a long period (as measured by small-angle X-ray scattering) thicker than 20 nm formed within the polypropylene fibers due to the lack of a post-heatsetting step being performed. Again, these thick lamellae provide the desired inventive higher heat-shrink fiber. Also of importance is the fact that, for instance, Connor et al. require a nonwoven polypropylene fabric laminate containing a DBS additive situated around a polypropylene internal fabric layer which contained no nucleating agent additive. The internal layer, being polypropylene without the aid of a nucleating agent additive, dictates the shrink rate for this structure. Furthermore, the patentees do not expose their yarns and fibers to heat-setting procedures in order to permanently configure the crystalline fiber structures of the yarns themselves as low-shrink is not their objective.

In addition, Spruiell, et al, *Journal of Applied Polymer Science*, Vol. 62, pp. 1965–75 (1996), reveal using a nucleating agent, MDBS, at 0.1%, to increase the nucleation rate during spinning. However, after crystallizing and drawing the fiber, Spruiell et al. do not expose the nucleated fiber to any heat, which is necessary to impart the very best shrinkage properties, therefore the shrinkage of their fibers was similar to conventional polypropylene fibers without a nucleating agent additive. In the examples below, yarn made with similar levels of nucleating agent additives included and no further heat exposure showed worse shrinkage (at all measured temperatures after the standard 5 minute exposure time) than commercial fibers, and fibers which contained no additive and were exposed to the same conditions. Thus, in addition to the presence of the nucleating agent additive, exposure to heat after mechanical drawing is a crucial step in the invention.

Of particular interest and which has been determined to be of primary importance in the production of such inventive low-shrink polypropylene fibers, is the discovery that, at the very least, the presence of nucleating agent within heat-set polypropylene fibers (as discussed herein), provides high long period measurements for the crystalline lamellae of the polypropylene itself. This discovery is best explained by the following:

Polymers, when crystallized from a melt under dynamic temperature and stress conditions, first supercool and then crystallize with the crystallization rate dependent on the number of nucleation sites, and the growth rate of the polymer, which are both in turn related to the thermal and mechanical working that the polymer is subjected to as it cools. These processes are particularly complex in a normal fiber drawing line. The results of this complex crystallization, however, can be measured using small angle x-ray scattering (SAXS), with the measured SAXS long period representative of an average crystallization temperature. A higher SAXS long period corresponds to thicker lamellae (which are the plate-like polymer crystals characteristic of semi-crystalline polymers like PP). The higher the crystallization temperature of the average crystal, the thicker the measured SAXS long period will be. Further, higher SAXS long periods are characteristic of more thermally stable polymeric crystals. Crystals with shorter SAXS long periods will "melt", or relax and recrystallize into new, thicker crystals, at a lower temperature than those with higher SAXS long periods. Crystals with higher SAXS long periods remain stable to higher temperatures, requiring more heat to destabilize the crystalline structure.

In highly oriented polymeric samples such as fibers, those with higher SAXS long periods will remain stable to higher temperatures. Thus the shrinkage, which is a normal effect of the relaxation of the highly oriented polymeric samples, remains low to higher temperatures than in those highly oriented polymeric samples with lower SAXS long periods. In this invention, as is evident from these measurements, the nucleating additive is used in conjunction with a thermal treatment to create fibers with extremely high SAXS long periods of at least 20 nm, or preferably at least 22 nm, which in turn are very stable and exhibit low shrinkage up to very high temperatures.

Furthermore, such fibers may also be colored to provide other aesthetic features for the end user. Thus, the fibers may also comprise coloring agents, such as, for example, pigments, with fixing agents for lightfastness purposes. For this reason, it is desirable to utilize nucleating agents that do not impart visible color or colors to the target fibers. Other additives may also be present, including antistatic agents, brightening compounds, clarifying agents, antioxidants, antimicrobials (preferably silver-based ion-exchange compounds, such as ALPHASAN® antimicrobials available from Milliken & Company), UV stabilizers, fillers, and the like. Furthermore, any fabrics made from such inventive fibers may be, without limitation, woven, knit, non-woven, in-laid scrim, any combination thereof, and the like. Additionally, such fabrics may include fibers other than the inventive polypropylene fibers, including, without limitation, natural fibers, such as cotton, wool, abaca, hemp, ramie, and the like; synthetic fibers, such as polyesters, polyarnides, polyaramids, other polyolefins (including non-low-shrink polypropylene), polylactic acids, and the like; inorganic fibers such as glass, boron-containing fibers, and the like; and any blends thereof.

BRIEF DESCRIPTION OF THE DRAWINGS

The accompanying drawings, which are incorporated in and constitute a part of this specification, illustrate a potentially preferred embodiment of producing the inventive low-shrink polypropylene fibers and together with the description serve to explain the principles of the invention wherein.

DETAILED DESCRIPTION OF THE DRAWING AND OF THE PREFERRED EMBODIMENT

Figure 1:
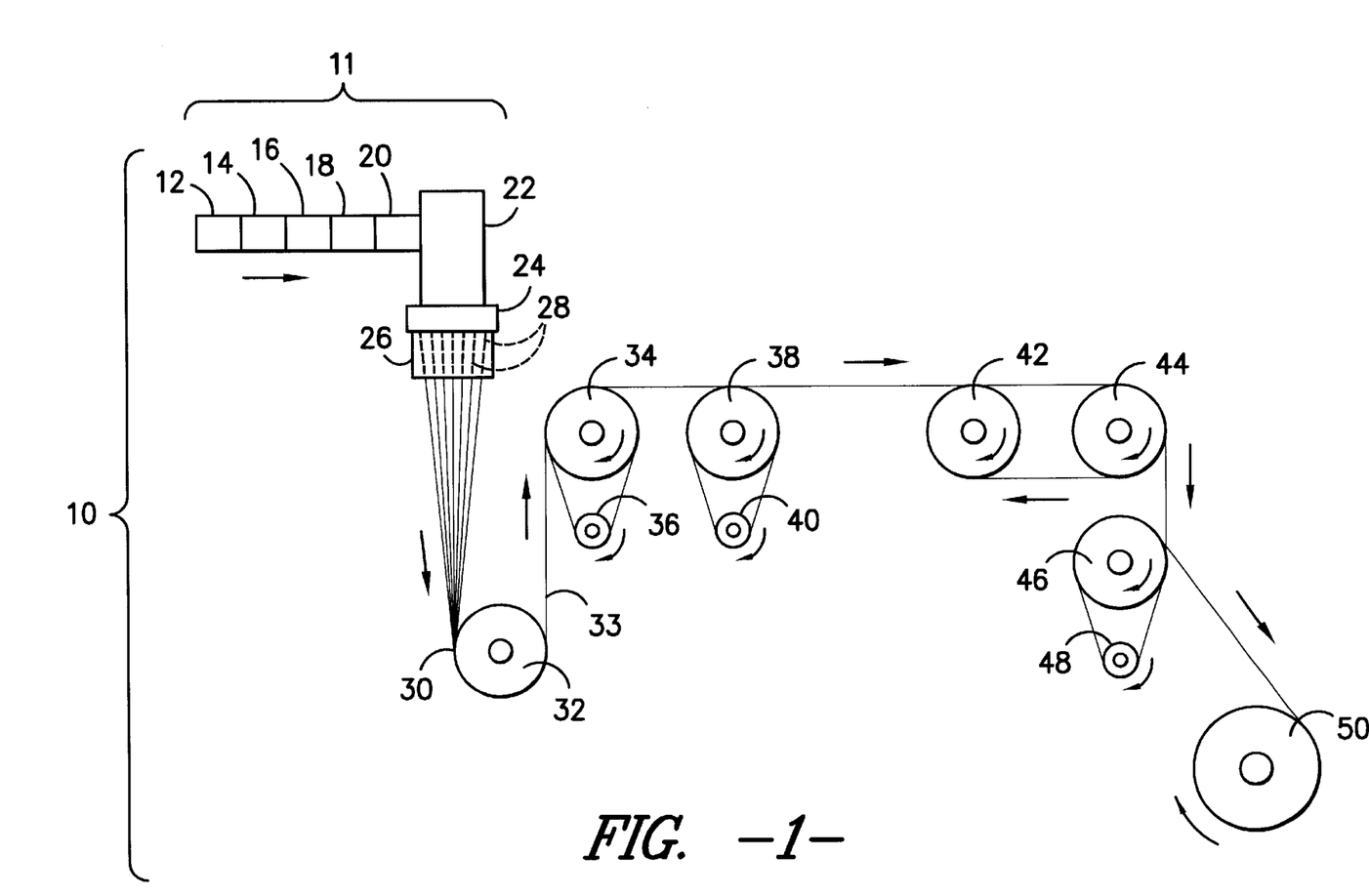
FIG. 1 is a schematic of the potentially preferred method of producing low-shrink polypropylene.

FIG. 1 depicts the non-limiting preferred procedure followed in producing the inventive low-shrink polypropylene fibers. The entire fiber production assembly 10 comprises an extruder 11 comprising four different zones 12, 14, 16, 18 through which the polymer (not illustrated) passes at different, increasing temperatures. The molten polymer is mixed with the nucleator compound (also molten) within a mixer zone 20. Basically, the polymer (not illustrated) is introduced within the fiber production assembly 10, in particular within the extruder 11. The temperatures, as noted above, of the individual extruder zones 12, 14, 16, 18 and the mixing zone 20 are as follows: first extruder zone 12 at 205° C., second extruder zone 14 at 215° C., third extruder zone 16 at 225° C., fourth extruder zone 18 at 235° C., and mixing zone 20 at 245° C. The molten polymer (not illustrated) then moves into a spin head area 22 set at a temperature of 250° C. which is then moved into the spinneret 24 (also set at a temperature of 250° C.) for strand extrusion. The fibrous strands 28 then pass through a heated shroud 26 having an exposure temperature of 180° C. The speed at which the polymer strands (not illustrated) pass through the extruder 11, spin pack 22, and spinneret 24 is relatively slow until the fibrous strands 28 are pulled through by the draw rolls 32, 34, 38. The fibrous strands 28 extend in length due to a greater pulling speed in excess of the initial extrusion speed within the extruder 11. The fibrous strands 28 are thus collected after such extension by a take-up roll 32 (set at a speed of 370 meters per minute) into a larger bundle 30 which is drawn by the aforementioned draw rolls 34, 38 into a single yarn 33. The draw rolls are heated to a very low level as follows: first draw roll 34 68° C. and second draw roll 38 88° C., as compared with the remaining areas of high temperature exposure as well as comparative fiber drawing processes. The first draw roll 34 rotates at a speed of about 377 meters per minute and is able to hold fifteen wraps of the polypropylene fiber 33 through the utilization of a casting angle between the draw roll 34 and the idle roll 36. The second draw roll 38 rotates at a higher speed of about 785 meters per minute and holds eight wraps of fiber 33, and thus requires its own idle roll 40. After drawing by these cold temperature rolls 34, 38, the fiber is then heat-set by a combination of two different heat-set rolls 42, 44 configured in a return scheme such that eighteen wraps of fiber 33 are permitted to reside on the rolls 42, 44 at any one time. The time of such heat-setting is very low due to a low amount of time in contact with either of the actual rolls 42, 44, so a total time of about 0.5 seconds is standard. The temperatures of such rolls 42, 44 are varied below to determine the best overall temperature selection for such a purpose. The speed of the combination of rolls 42, 44 is about 1290 meters per minute. The fiber 33 then moves to a relax roll 46 holding up to eight wraps of fiber 33 and thus also having its own feed roll 48. The speed of the relax roll 46 is lower than the heat-set roll (1280 meters per minute) in order to release some tension on the heat-set fiber 33. From there, the fiber 33 moves to a winder 50 and is placed on a spool (not illustrated).

Inventive Fiber and Yarn Production

The following non-limiting examples are indicative of the preferred embodiment of this invention:
Yarn Production Yarn was made by compounding Amoco 7550 fiber grade polypropylene resin (melt flow of 18) with a nucleator additive and a standard polymer stabilization package consisting of 500 ppm of Irganox® 1010, 1000 ppm of Irgafos® 168 (both antioxidants available from Ciba), and 800 ppm of calcium stearate. The base mixture was compounded at 2500 ppm in a twin screw extruder (at 220° C. in all zones) and made into pellets. The additive was selected from the group of three polypropylene clarifiers commercially available from Milliken & Company, Millad® 3905 (DBS), Millad® 3940 (p-MDBS sorbitol), Millad® 3988 (3,4-DMDBS), two polypropylene nucleators commercially available from Asahi-Denka Chemical Company (NA-11 and NA-21), sodium benzoate, Liquid 3,4-DMDBS, and 1,3:2,4-bis(2,4,5-trimethylbenzylidene)sorbitol(2,4,5-TMDBS).

The pellets were then fed into the extruder on an Alex James & Associates fiber extrusion line as noted above in FIG. 1. Yarn was spun with the extrusion line conditions shown in Table 1using a 68 hole spinneret, giving a yarn of nominally 150 denier. For each additive, four yarns were spun with heat-set temperatures of 100°, 110°, 120°, and 130° C. respectively. These temperatures are the set temperatures for the controller for the rolls 42, 44. In practice, a variation is found to exist over the surface of the rolls 42, 44, up to as much as 10° C. Pellets with no nucleator additive were used to make control fibers.

The yarns were tested for shrinkage in boiling water by cutting a length of yarn, marking the ends of a 10" section with tape, placing the yarn in boiling water for 5 minutes, then taking the yarn out and measuring the length of the section between the tape marks. Measurements were taken on five pieces of each yarn, and the average change in dimension is divided by the initial length (10 inches) to give % shrinkage. Also, the measurements below have a statistical error of +/−0.4 percentage units.

The yarns were similarly tested for shrinkage in hot air at 150° C. and 130° C. by marking a 10" section of yarn, placing it in an oven for five minutes at the measurement temperature, and similarly measuring the % shrinkage after removing the yarn from the oven. Again, five samples were measured, and the average shrinkage results are reported for each sample in Table 1. The shrink measurements are listed below the tested nucleators for each yarn sample. The yarn samples were as follows:

| POLYPROPYLENE YARN COMPOSITION TABLE Yarn Samples with Specific Nucleators Added | |
|---|---|
| Yarn Sample | Nucleator Added |
| A | NA-11 |
| B | NA-21 |
| C | Sodium Benzoate |
| D | DBS |
| E | p-MDBS |
| F | 3,4-DMDBS |
| G | Liquid 3,4-DMDBS |
| H | 2,4,5-TMDBS |
| I(Comparative) | None (Control) |

Fiber and Yarn Physical Analyses

These sample yarns were then tested for shrink characteristics with a number of different variables including heat-set temperatures differences (on the heat-set rolls) during manufacture and different heat-exposure conditions (hot air at various temperatures and boiling water exposure at temperatures in excess of 100° C.). The results are tabulated below:

EXPERIMENTAL TABLE 1

Experimental Shrink Measurements for Sample Yarns

| Sample Yarn | Heatset Temp. (° C.) | Shrinkage Test and Temp. (° C.) | Shrinkage |
|---|---|---|---|
| A | 100 | 150 Hot air | 9.5% |
| A | 110 | 150 Hot air | 9.4% |
| A | 120 | 150 Hot air | 8.1% |
| A | 130 | 150 Hot air | 6.7% |
| A | 100 | 130 Hot air | 7.4% |
| A | 110 | 130 Hot air | 5.9% |
| A | 120 | 130 Hot air | 4.9% |
| A | 130 | 130 Hot air | 4.0% |
| A | 100 | Boiling water | 4.9% |
| A | 110 | Boiling water | 4.1% |
| A | 120 | Boiling water | 3.6% |
| A | 130 | Boiling water | 2.7% |
| B | 100 | 150 Hot air | 11.1% |
| B | 110 | 150 Hot air | 10.1% |
| B | 120 | 150 Hot air | 9.3% |
| B | 130 | 150 Hot air | 6.7% |
| B | 100 | 130 Hot air | 8.1% |
| B | 110 | 130 Hot air | 7.3% |
| B | 120 | 130 Hot air | 6.3% |
| B | 130 | 130 Hot air | 3.4% |
| B | 100 | Boiling water | 5.6% |
| B | 110 | Boiling water | 4.7% |
| B | 120 | Boiling water | 2.7% |
| B | 130 | Boiling water | 2.3% |
| C | 100 | 150 Hot air | 10.9% |
| C | 110 | 150 Hot air | 11.2% |
| C | 120 | 150 Hot air | 9.5% |
| C | 130 | 150 Hot air | 7.1% |
| C | 100 | 130 Hot air | 7.8% |
| C | 110 | 130 Hot air | 7.4% |
| C | 120 | 130 Hot air | 6.2% |
| C | 130 | 130 Hot air | 4.5% |
| C | 100 | Boiling water | 6.0% |
| C | 110 | Boiling water | 5.0% |
| C | 120 | Boiling water | 3.9% |
| C | 130 | Boiling water | 2.6% |
| D | 100 | 150 Hot air | 9.8% |
| D | 110 | 150 Hot air | 9.7% |
| D | 120 | 150 Hot air | 9.5% |
| D | 130 | 150 Hot air | 5.8% |
| D | 100 | 130 Hot air | 7.4% |
| D | 110 | 130 Hot air | 6.9% |
| D | 120 | 130 Hot air | 6.2% |
| D | 130 | 130 Hot air | 2.9% |
| D | 100 | Boiling water | 5.6% |
| D | 110 | Boiling water | 4.5% |
| D | 120 | Boiling water | 3.1% |
| D | 130 | Boiling water | 2.1% |
| E | 100 | 150 Hot air | 10.9% |
| E | 110 | 150 Hot air | 9.2% |
| E | 120 | 150 Hot air | 8.0% |
| E | 130 | 150 Hot air | 4.0% |
| E | 100 | 130 Hot air | 7.5% |
| E | 110 | 130 Hot air | 6.1% |
| E | 120 | 130 Hot air | 4.5% |
| E | 130 | 130 Hot air | 2.7% |
| E | 100 | Boiling water | 4.6% |
| E | 110 | Boiling water | 4.0% |
| E | 120 | Boiling water | 2.4% |
| E | 130 | Boiling water | 1.9% |
| F | 100 | 150 Hot air | 13.6% |
| F | 110 | 150 Hot air | 12.4% |
| F | 120 | 150 Hot air | 7.3% |
| F | 130 | 150 Hot air | 7.2% |
| F | 100 | 130 Hot air | 9.2% |
| F | 110 | 130 Hot air | 8.0% |
| F | 120 | 130 Hot air | 3.7% |
| F | 130 | 130 Hot air | 3.4% |
| F | 100 | Boiling water | 6.5% |
| F | 110 | Boiling water | 4.0% |
| F | 120 | Boiling water | 2.6% |
| F | 130 | Boiling water | 2.7% |
| G | 100 | 150 Hot air | 12.9% |
| G | 110 | 150 Hot air | 11.7% |
| G | 120 | 150 Hot air | 9.3% |
| G | 130 | 150 Hot air | 7.6% |
| G | 100 | 130 Hot air | 9.2% |
| G | 110 | 130 Hot air | 8.8% |
| G | 120 | 130 Hot air | 6.5% |
| G | 130 | 130 Hot air | 4.3% |
| G | 100 | Boiling water | 6.0% |
| G | 110 | Boiling water | 5.3% |
| G | 120 | Boiling water | 3.9% |
| G | 130 | Boiling water | 2.8% |
| H | 100 | 150 Hot air | 12.2% |
| H | 110 | 150 Hot air | 10.9% |
| H | 120 | 150 Hot air | 9.6% |
| H | 130 | 150 Hot air | 6.8% |
| H | 100 | 130 Hot air | 8.9% |
| H | 110 | 130 Hot air | 8.0% |
| H | 120 | 130 Hot air | 6.3% |
| H | 130 | 130 Hot air | 3.0% |
| H | 100 | Boiling water | 5.5% |
| H | 110 | Boiling water | 4.7% |
| H | 120 | Boiling water | 3.3% |
| H | 130 | Boiling water | 2.1% |
| I | 100 | 150 Hot air | 21.3% |
| I | 110 | 150 Hot air | 19.3% |
| I | 120 | 150 Hot air | 17.4% |
| I | 130 | 150 Hot air | 13.4% |
| I | 100 | 130 Hot air | 12.5% |
| I | 110 | 130 Hot air | 10.7% |
| I | 120 | 130 Hot air | 8.6% |
| I | 130 | 130 Hot air | 5.3% |
| I | 100 | Boiling water | 6.8% |
| I | 110 | Boiling water | 5.2% |
| I | 120 | Boiling water | 3.2% |
| I | 130 | Boiling water | 3.2% |

In addition, two commercial yarns were obtained from Filament Fiber Technology and tested in each of the three tests, with the results shown in Table 3. Commercial Yarn #1 is an air jet textured yarn with a black pigment. Commercial Yarn #2 is an air jet textured yarn with a white pigment.

EXPERIMENTAL TABLE 2

Experimental Data for Comparative Commercial Polypropylene Yarns

| Test | Comm. Yarn #1 | Comm. Yarn #2 |
|---|---|---|
| 150° C. Hot air shrinkage | 13.0% | 12.1% |
| 130° C. Hot air shrinkage | 7.8% | 7.0% |
| Boiling water shrinkage | 4.8% | 5.5% |

It is evident from these two TABLEs that the inventive polypropylene yarns (including those made from the inventive method described above) exhibit vastly improved shrinkage rates for all three test methods and thus are clearly improvements over the commercially available prior art yarns as well as those yarns lacking nucleating agent and heat-set.

Additive Level Dependence

To test the dependence on nucleator additive level, additional yarns were spun in accordance with the method described above with varying levels of additive using Amoco 7550 resin. The additive was compounded into the resin and the fibers spun under the same conditions as in the previous examples. The yarns were similarly tested, with the results shown in Table 5.

POLYPROPYLENE YARN SAMPLE TABLE
Yarn Samples with Specific Nucleators Added

| Yarn Sample | Nucleator Added (Amount ppm) |
|---|---|
| J | NA-11 (1000) |
| K | 3,4-DMDBS (1250) |
| L | 2,4,5-TMDBS (1250) |

EXPERIMENTAL TABLE 3

Experimental Data for Different
Nucleator Levels in Polypropylene Yarns

| Sample Yarn | Heatset Temp. (° C.) | Shrinkage Test and Temp. (° C.) | Shrinkage |
|---|---|---|---|
| J | 100 | 150 Hot air | 18.1% |
| J | 110 | 150 Hot air | 16.6% |
| J | 120 | 150 Hot air | 16.7% |
| J | 130 | 150 Hot air | 9.0% |
| J | 100 | 130 Hot air | 10.4% |
| J | 110 | 130 Hot air | 9.0% |
| J | 120 | 130 Hot air | 6.8% |
| J | 130 | 130 Hot air | 4.5% |
| J | 100 | Boiling water | 5.4% |
| J | 110 | Boiling water | 4.8% |
| J | 120 | Boiling water | 3.3% |
| J | 130 | Boiling water | 2.6% |
| K | 100 | 150 Hot air | 15.7% |
| K | 110 | 150 Hot air | 17.1% |
| K | 120 | 150 Hot air | 13.0% |
| K | 130 | 150 Hot air | 8.8% |
| K | 100 | 130 Hot air | 9.3% |
| K | 110 | 130 Hot air | 8.6% |
| K | 120 | 130 Hot air | 5.5% |
| K | 130 | 130 Hot air | 4.0% |
| K | 100 | Boiling water | 6.8% |
| K | 110 | Boiling water | 4.5% |
| K | 120 | Boiling water | 3.3% |
| K | 130 | Boiling water | 2.5% |
| L | 100 | 150 Hot air | 16.9% |
| L | 110 | 150 Hot air | 15.8% |
| L | 120 | 150 Hot air | 13.2% |
| L | 130 | 150 Hot air | 8.7% |
| L | 100 | 130 Hot air | 11.1% |
| L | 110 | 130 Hot air | 9.2% |
| L | 120 | 130 Hot air | 6.8% |
| L | 130 | 130 Hot air | 4.5% |
| L | 100 | Boiling water | 6.8% |
| L | 110 | Boiling water | 4.3% |
| L | 120 | Boiling water | 3.3% |
| L | 130 | Boiling water | 2.3% |

Thus, additive levels are important to providing overall good low shrinkage characteristics for the target polypropylene yarns. Higher levels appear to provide better shrinkage properties.

X-ray Scattering Analysis

The long period spacing of several of the above yarns was tested by small angle x-ray scattering (SAXS). The small angle x-ray scattering data was collected on a Bruker AXS (Madison, Wis.) Hi-Star multi-wire detector placed at a distance of 105 cm from the sample in an Anton-Paar vacuum chamber where the chamber was evacuated to a pressure of not more than 100 mTorr. X-rays ($\lambda$=1.54178 Å) were generated with a MacScience rotating anode (40 kV, 40 mA) and focused through three pinholes to a size of 0.2 mm. The entire system (generator, detector, beampath, sample holder, and software) is commercially available as a single unit from Bruker AXS. The detector was calibrated per manufacturer recommendation using a sample of silver behenate.

A typical data collection was conducted as follows. To prepare the sample, the yarn was wrapped around a 3 mm brass tube with a 2 mm hole drilled in it, and then the tube was placed in an Anton-Paar vacuum sample chamber on the x-ray equipment such that the yarn was exposed to the x-ray beam through the hole. The path length of the x-ray beam through the sample was between 2–3 mm. The sample chamber and beam path was evacuated to less than 100 mTorr and the sample was exposed to the X-ray beam for one hour. Two-dimensional data frames were collected by the detector and unwarped automatically by the system software. The data were smoothed within the system software using a 2-pixel convolution prior to integration. To obtain the intensity scattering data [I(q)] as a function of scattering angle [2θ] the data were integrated over φ with the manufacturer's software set to give a 2θ range of 0.2°–2.5° in increments of 0.01° using the method of bin summation. These raw scattering data were then transformed into a real space correlation function K(z) using a FORTRAN program written in house to evaluate the integral:

$$K(z) = \int_0^\infty 4\pi q^2 I(q)\cos(2\pi qz)\,dq \text{ where } q = 4\pi\sin(\theta)/\lambda.$$

Figure 2:
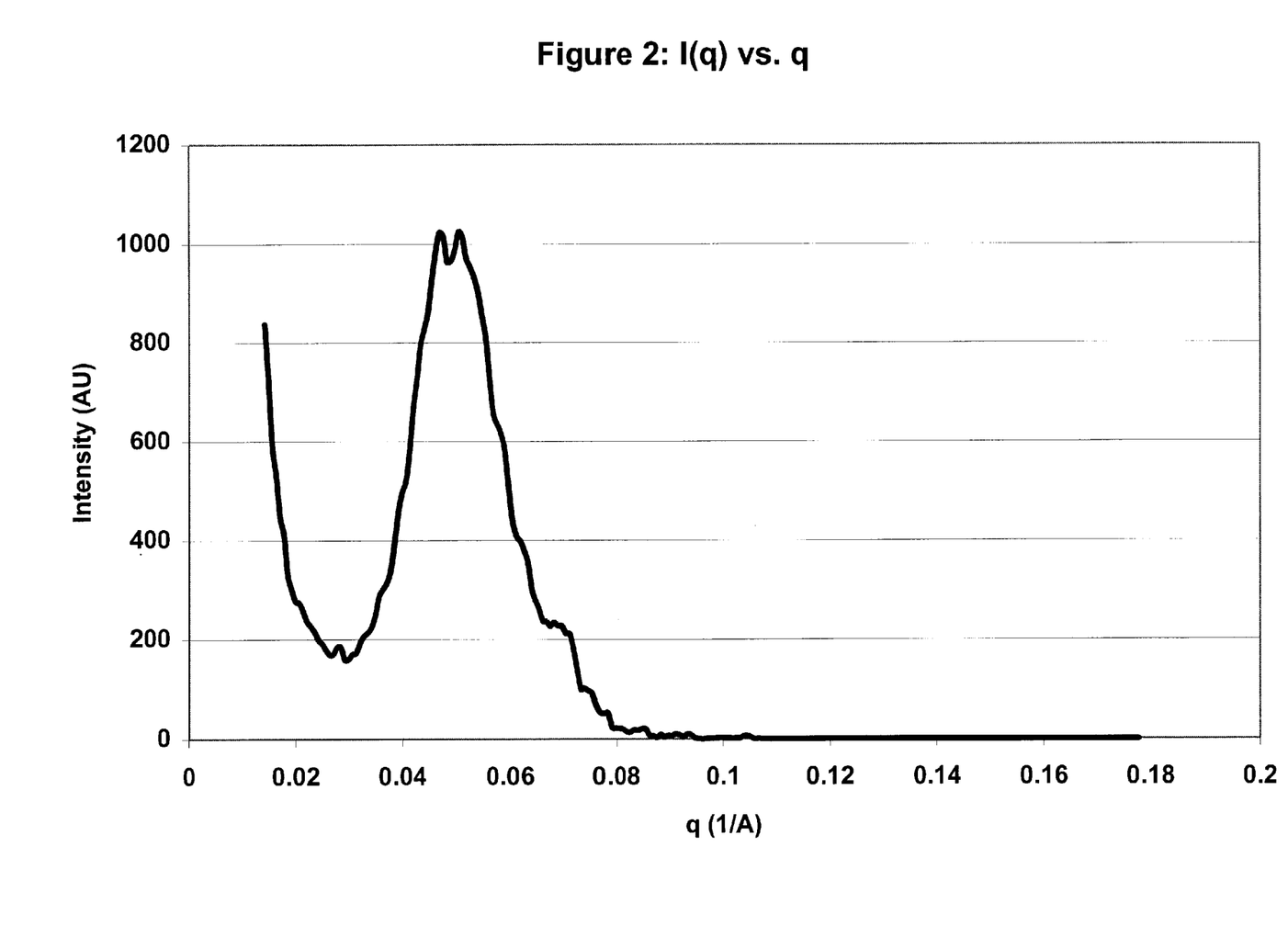
FIG. 2 is described in greater detail below with regard to small angle X-ray scattering and is a graphical representation of the integrated intensity data I(q) as a function of $2\theta$ in order to determine the long period spacing of the target fibers.
Figure 3:
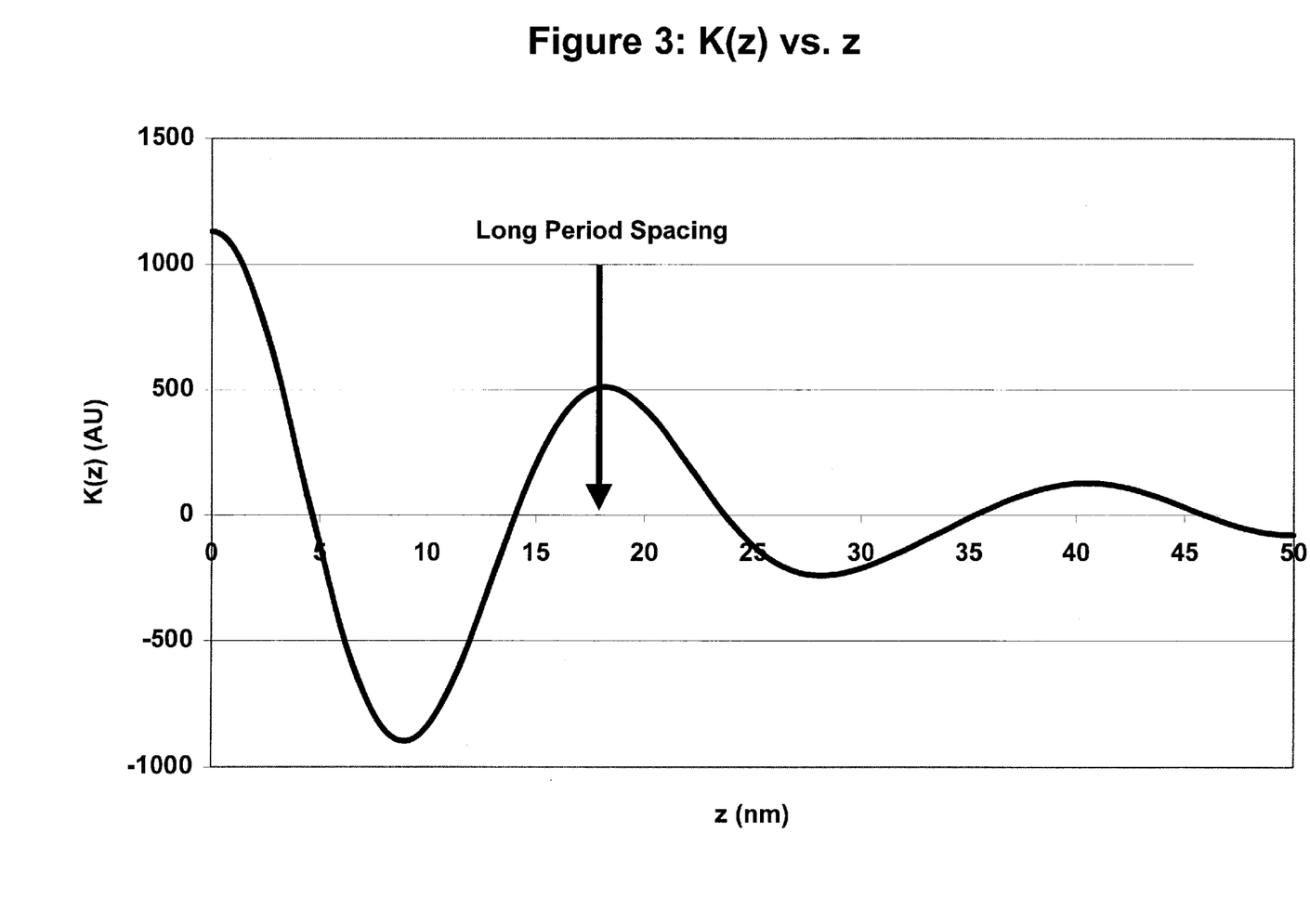
FIG. 3 is also described in greater detail below with regard to small angle X-ray scattering and is a graphical representation of the K(z) function to aid in the ultimate determination of long period spacing.

The integral was evaluated by direct summation over all values 2θ in the data range (0.2°–2.5°) and over the real space values from 0 nm–50 nm. This follows the method of G. Strobl (Strobl G. *The Physics of Polymers*; Springer: Berlin 1997, pp. 408–14), entirely incorporated by reference. From the one-dimensional correlation function, K(z), one can extract the morphological data of interest, in this case long period spacing (L). The integrated intensity data I(q) as a function of 2θ demonstrates a broad hump corresponding to the long period spacing (FIG. 2). The K(z) function has a characteristic shape (FIG. 3). The relevant extractable data points are indicated. Long-period spacing is extracted from K(z) data as the global maximum of the function occurring at a higher z value than the global minimum.

These data are collected in Table 6. Also included in Table 6 are the measurements as a result of 150° C. hot air exposure (to test for shrinkage). As can be clearly seen, a longer SAXS long period corresponds to a lower shrinkage. In addition, samples prepared with the additive, but without sufficient heat in the process (represented in this case by a 130° C. heatset), gave a smaller SAXS long period and a correspondingly higher 150° C. hot air shrinkage. The following TABLE thus shows the correlation between SAXS long period measurements with 150° C. hot air exposure (for shrinkage of the target yarns), as well as the correlation between heat-set temperatures with such characteristics.

EXPERIMENTAL TABLE 4

SAXS and 150° C. Hot Air
Shrinkage Data For Yarn Samples

| Sample Yarn | Heat-set Temp. (° C.) | Shrinkage | SAXS Long Period |
|---|---|---|---|
| A | 130 | 6.7% | 26.45 |
| B | 130 | 6.7% | 22.35 |
| C | 130 | 7.1% | 21 |
| D | 130 | 5.8% | 23.2 |
| E | 130 | 4.0% | 26.4 |
| E | 120 | 8.0% | 21 |
| E | 110 | 9.2% | 18.4 |

EXPERIMENTAL TABLE 4-continued

SAXS and 150° C. Hot Air
Shrinkage Data For Yarn Samples

| Sample Yarn | Heat-set Temp. (° C.) | Shrinkage | SAXS Long Period |
|---|---|---|---|
| F | 130 | 7.2% | 21.55 |
| H | 130 | 6.8% | 22.4 |
| Comm. Yarn 1 | — | 12.1% | 16.95 |
| Comm. Yarn 2 | — | 13.0% | 15.6 |

It is thus evident that the higher the long period as measured by small-angle X-ray scattering, the lower the shrinkage exhibited by the target polypropylene yarn.

Peak Crystallization Temperatures

As noted above, in order to provide the desired low-shrink characteristics to the target yarns and/or fibers, a nucleating agent should be added. Although the presence of a nucleating agent or agents is necessary to accord such low-shrink properties in tandem with a proper heat-setting of the fiber and/or yarn, it is not a requirement that all nucleating agents present within the target yarn and/or fiber exhibit a relatively high peak crystallization temperature. There are certain instances, however, wherein the nucleating agent does induce such high peak crystallization temperatures and thus their presence may be determined through differential scanning calorimetry analysis. For those nucleating agents that do not induce the target polymer to exhibit such high peak crystallization temperatures, other methods of analysis (gas chromatography/mass spectroscopy, as one example) may be utilized to determine their presence. For example, although sodium benzoate is well known as a polyolefin nucleating agent (as defined above), peak crystallization results within polypropylene yarns and/or fibers are not consistent with accepted results for sodium benzoate within other types of polypropylene articles (such as plaques, containers, and the like). Some peak crystallization measurements for sodium benzoate within polypropylene fibers have been nearly as low as the measurements for the polypropylene itself. Again, since sodium benzoate provides effective low-shrink characteristics for such fibers and/or yarns, the lack of high peak crystallization temperatures for such sodium benzoate-containing polypropylene fiber samples does not remove sodium benzoate from the definition of nucleating agent for the purposes of this invention.

Thus, for the polypropylene samples including the remaining types of nucleating agents, peak crystallization was measured by the following method (a modified version of ASTM D3417-99 including a manner of creating a proper measurable sample of the test fibers themselves): A Perkin-Elmer DSC7 calibrated with an indium metal standard at a heating rate of 20° C./min was used to measure the peak crystallization temperature of the polypropylene fibers. Bundles of polypropylene fibers were heated to 220° C. for 1 minute and then compressed into thin disks approximately 250 μm thick. The specific polyolefin/DBS mixture composition was heated from 60° C. to 220° C. at a rate of 20° C. per minute to produce a molten formulation and held at the peak temperature for 2 minutes. At that time, the temperature was then lowered at a rate of 20° C. per minute until it reached the starting temperature of 60° C. The peak crystallization temperature of the polymer was thus measured as the peak maximum during the crystallization exotherm. This entire procedure of first preparing fibers into plaques followed by DSC analysis in accordance with the modified ASTM D-3417-99 test is herein referred to as "fiber peak crystallization temperature measurement(s)" for the purposes of this invention. The results for the fiber peak crystallization temperature measurements for the samples from Table 1, above, are tabulated below (with a standard deviation of +/−0.5° C.):

EXPERIMENTAL TABLE 5

Peak Crystallization
Temperatures For Yarn Samples

| Sample Yarn | Heat-set Temp. (° C.) | Peak Crystallization Temperature (Tc) (° C.) |
|---|---|---|
| A | 120 | 124.3 |
| B | 130 | 124.6 |
| D | 130 | 117.0 |
| E | 130 | 123.7 |
| F | 130 | 124.5 |
| H | 130 | 122.2 |
| I (Comparative) | 130 | 109.9 |

Thus, the presence of certain nucleating agents provided relatively high peak crystallization temperatures for the sample yarns (at least above 115° C., and as high as a low level of about 117.0° C.).

Fabric Article Production and Analyses

Woven Fabric Comprising the Inventive Yarn

Fabric was woven using the inventive yarns and a 150 denier, 34 filament polyester warp, and weaving a square weave with 84 picks/inch using five yarns: a control made as above with no additive with final draw roll 3A and 3B temperatures of 110° C. and 130° C. Three experimental yarns were made having 2500 ppm 3,4-DMDBS (Sample yarns F, from above) and a final draw roll 3A and 3B temperature of 110° C., 130° C., and 140° C. respectively. These sample fabrics were separated into 18 inch squares. A 12" box was drawn in the center of the piece of fabric, and the fabric was washed five times in either hot (60° C.) or cold (20° C.) water, and dried for 30 minutes in a conventional dryer (at about 70° C. for 20 minutes). The dimensional change of the 12" box was measured, and is reported in Table 6 as % shrinkage.

EXPERIMENTAL TABLE 6

Fabric Sample Shrinkage Data

| Sample Fabric (corresponding to TABLE 1, above) | Yarn Heat-set Roll Temp. (° C.) | Cold Wash Shrinkage | Hot Wash Shrinkage |
|---|---|---|---|
| F | 110 | 2.4% | 5.8% |
| F | 130 | 2.9% | 3.7% |
| F | 140 | 2.4% | 3.7% |
| I (Comparative) | 110 | 8.9% | 14.9% |
| I (Comparative) | 130 | 5.0% | 6.8% |

Thus, it is evident that the fabric samples comprising the inventive yarns exhibit lower shrinkage rates as well.

Knit Fabric Construction Comprising the Inventive Yarn

Yarns from TABLE 1 were produced with a heat-set roll temperature of 130° C. and were subsequently knit into socks on a Lawson Hemphill FAK Knitter 36 gage knitting machine using 160 needles (needle no. 71:70) at speed setting 4 using 40 PSI of air pressure. The fabric was laid flat, and a 2.75"×10" section of sock was marked (10" in the course direction, 2.75" in the wales direction). The socks were placed in an oven at 150° C. (hot air) for five minutes, and then the dimensions of the marked section were measured. The shrinkage in each direction and the area shrinkage are reported in TABLE 8, below. The area shrinkage is the product of the measured dimensions (the area) divided by 27.5 sq. inches (the original area), reported as a percentage.

EXPERIMENTAL TABLE 7

150° C. Hot Air Shrinkage
Data For Knit Fabric Samples

| Sample Yarn | Course Shrinkage | Wales Shrinkage | Area Shrinkage |
|---|---|---|---|
| A | 5.3% | 2.8% | 8.0% |
| B | 7.2% | 2.8% | 9.8% |
| C | 8.8% | 2.2% | 10.8% |
| D | 0.6% | 3.4% | 4.0% |
| E | 1.6% | 1.6% | 3.2% |
| F | 5.6% | 2.8% | 8.2% |
| H | 7.2% | 2.2% | 9.2% |
| I (Comparative) | 11.3% | 4.4% | 15.2% |
| Comm. Yarn 1 | 20.6% | 5.3% | 24.8% |
| Comm. Yarn 2 | 20.0% | 3.8% | 23.0% |

Therefore, it is evident that the inventive knit fabrics exhibit far better shrinkage characteristics than the commercial yarn-containing fabric samples as well as the control without any nucleator compound present. The control yarn gave very high area shrinkage, which was eclipsed by the air jet textured commercial yarns. Yarns with DBS and p-MDBS gave very low shrinkage, easily acceptable within the apparel industry.

Non-woven Fabric Construction Comprising the Inventive Yarn

Yarns from Sample E of TABLE 1 were produced with a heat-set roll temperature of 130° C. and were extruded at a pump rate of 87.6 cc/min with a 68 hole spinneret, to give a total yarn denier of 680 and a denier per filament of 10. The fibers were combined by plying such into 5 yarns of 2720 denier, which were then combined into a single tow of 13600 denier, which was heated at ~90° C. in steam, crimped in a stuffer box, and then cut to a staple length of 3.25 inches. The staple was then carded, lapped using a Fiber Locker manufactured by James Hunter Machine Company, and then needled with a Di-Lour-6 manufactured by Dilo, Inc. into a bat approximately 12×24 inches. Boxes of 130.3 cm² were marked on the bat. The bat was then molded by heating with an IR lamp for 60 seconds to temperatures reaching 120–150° C. and then compressing in a 10° C. mold. The boxes showed average shrinkage of 3.2%.

A control yarn of 10 DPF with no additive was obtained. It was then crimped and cut into staple, carded, lapped, and needled in the same manner. Boxes were again marked prior to molding. When molded under the same conditions, the boxes showed an average shrinkage of 11.7%.

It is thus evident that the non-woven fabrics made from the inventive low-shrink propylene yarns also exhibit excellent low-shrink characteristics in comparison with control samples.

There are, of course, many alternative embodiments and modifications of the present invention which are intended to be included within the spirit and scope of the following claims.

What we claim is:

1. A polypropylene fiber possessing at most 5,000 denier per filament and exhibiting a heat-shrinkage in at least 150° C. hot air of at most 11%, wherein said fiber further comprises at least one nucleating agent, and wherein said fiber further exhibits a long period of at least 20 nm as measured by small-angle x-ray scattering.

2. The polypropylene fiber of claim 1 wherein said fiber possesses a denier per filament of at most 1,000, wherein said fiber exhibits a heat shrinkage in at least 150° C. hot air of at most 9%, wherein said at least one nucleating agent is present in an amount of at least 100 ppm, and wherein said fiber exhibits a long period of at least 22 nm.

3. The polypropylene fiber of claim 2, wherein said fiber possesses a denier per filament of at most 500, wherein said fiber exhibits a heat shrinkage in at least 150° C. hot air of at most 8%, and wherein said at least one nucleating agent is present in an amount of at least 1250 ppm.

4. The polypropylene fiber of claim 3, wherein said fiber possesses a denier per filament of at most 100 and wherein said fiber exhibits a heat shrinkage in at least 150° C. hot air of at most 8%.

5. The polypropylene fiber of claim 1 wherein said nucleating agent is selected from the group consisting of p-MDBS, 3,4-DMDBS, 2,4,5-TMDBS, Liquid 3,4-DMDBS, DBS, sodium benzoate, NA-11, NA-21, and any mixtures thereof.

6. The polypropylene fiber of claim 5 wherein said nucleating agent is p-MDBS.

7. A polypropylene fiber possessing at most 5,000 denier per filament and comprising at least one nucleating agent, and wherein said fiber further exhibits a long period of at least 20 nm as measured by small-angle x-ray scattering.

8. The polypropylene fiber of claim 7 wherein said fiber possesses a denier per filament of at most 1,000, wherein said at least one nucleating agent is present in an amount of at least 100 ppm, and wherein said fiber exhibits a long period of at least 22 nm.

9. The polypropylene fiber of claim 8, wherein said fiber possesses a denier per filament of at most 500, and wherein said at least one nucleating agent is present in an amount of at least 1250 ppm.

10. The polypropylene fiber of claim 9, wherein said fiber possesses a denier per filament of at most 100.

11. The polypropylene fiber of claim 7 wherein said nucleating agent is selected from the group consisting of p-MDBS, 3,4-DMDBS, 2,4,5-TMDBS, Liquid 3,4-DMDBS, DBS, sodium benzoate, NA-11, NA-21, and any mixtures thereof.

12. The polypropylene fiber of claim 11 wherein said nucleating agent is p-MDBS.

13. A polypropylene fiber possessing at most 5,000 denier per filament and exhibiting a fiber peak crystallization temperature measurement of at least 115° C. as measured by differential scanning calorimetry in accordance with ASTM Test Method D3417-99 at a cooling rate of 20° C./min, and wherein said fiber further exhibits a long period of at least 20 nm as measured by small-angle x-ray scattering.

14. The polypropylene fiber of claim 13, wherein said fiber possesses a denier per filament of at most 1,000, wherein said fiber peak crystallization temperature measurement is at least 116° C., and wherein said fiber exhibits a long period of at least 22 nm.

15. The polypropylene fiber of claim 14, wherein said fiber possesses a denier per filament of at most 500, and wherein said fiber exhibits a fiber peak crystallization temperature measurement of at least 116.5° C.

16. The polypropylene fiber of claim 15, wherein said fiber possesses a denier per filament of at most 100.

17. The polypropylene fiber of claim 13 wherein said fiber further comprises at least one nucleating agent.

18. The polypropylene fiber of claim 17 wherein said at least one nucleating agent is present in an amount of at least 100 ppm.

19. The polypropylene fiber of claim 18 wherein said at least one nucleating agent is present in an amount of at least 1250 ppm.

20. The polypropylene fiber of claim 17 wherein said nucleating agent is selected from the group consisting of p-MDBS, 3,4-DMDBS, 2,4,5-TMDBS, Liquid 3,4-DMDBS, DBS, sodium benzoate, NA-11, NA-21, and any mixtures thereof.

21. The propylene fiber of claim 20 wherein said nucleating agent is p-MDBS.

22. A yarn comprising at least one fiber as defined in claim 1.

23. A yarn comprising at least one fiber as defined in claim 1.

24. A yarn comprising at least one fiber as defined in claim 7.

25. A yarn comprising at least one fiber as defined in claim 13.

* * * * *

UNITED STATES PATENT AND TRADEMARK OFFICE
CERTIFICATE OF CORRECTION

PATENT NO.     : 6,541,554 B2                                                     Page 1 of 1
DATED          : April 1, 2003
INVENTOR(S)    : Brian G. Morin, Nathan A. Mehl and William S. Parks It is certified that error appears in the above-identified patent and that said Letters Patent is hereby corrected as shown below:

<u>Column 20,</u>
Line 5, delete "Claim 1" and insert -- Claim 7 --.
Line 8, delete "Claim 7" and insert -- Claim 13 --.
Line 28, delete Claim 25.

Signed and Sealed this

Twenty-eighth Day of October, 2003

JAMES E. ROGAN
*Director of the United States Patent and Trademark Office*